United States Patent Office 3,702,769
Patented Nov. 14, 1972

3,702,769
METHOD OF POLISHING LEATHER WITH COMPOSITIONS CONTAINING REACTION PRODUCT OF HYDROXY ENDBLOCKED SILOXANES AND AMINOFUNCTIONAL SILANES
James R. Vaughn, Greensboro, N.C., assignor to Dow Corning Corporation, Midland, Mich.
No Drawing. Continuation of abandoned application Ser. No. 703,533, Feb. 7, 1968. This application Jan. 4, 1971, Ser. No. 103,835
Int. Cl. C08h 9/06; C09f; C09g 1/08
U.S. Cl. 106—10        11 Claims

ABSTRACT OF THE DISCLOSURE

A leather polish is disclosed which not only polishes but cleans and preserves the leather. In addition, the polish makes the leather soft and supple while imparting water resistance. The polish is in the form of an emulsion which consists essentially of water, a solvent, a wax, an emulsifier and the reaction product of particular hydroxyl endblocked siloxanes and amino-functional silanes.

---

This invention relates to a polish that is useful for cleaning, protecting and polishing leather products. For example, the polish of this invention is useful for cleaning, protecting and polishing shoes, boots, purses handbags, luggage, saddles, holsters, gun cases and all other types of fine leather goods.

The use of the particular siloxanes of this invention imparts better gloss to the leather than do other siloxanes. The gloss is also much better than that obtained using nonsilicone containing polishes. In addition, the polish surface is highly resistant to water spotting.

More specifically, this invention relates to a leather polish which is an emulsion consisting essentially of 100 parts of water, 25 to 100 parts of a solvent, 2 to 120 parts of a wax, 4 to 25 parts of emulsifier and 1 to 30 parts of the reaction product of (1) a hydroxyl endblocked siloxane of the unit formula $R_2SiO$ wherein one R is a methyl radical and the other R is selected from the group consisting of the methyl, phenyl and 3,3,3-trifluoropropyl radicals, said siloxane having a viscosity in the range of about 10 to 15,000 cs. at 25° C., and (2) a silane of the general formula $R'_x(R''O)_{3-x}SiR'''NHR''''$ wherein R' is a monovalent hydrocarbon radical free of aliphatic unsaturation and contains from 1 to 6 carbon atoms, $x$ has a value from 0 to 2, R'' is an alkyl radical containing from 1 to 4 carbon atoms, R''' is a divalent hydrocarbon radical free of aliphatic unsaturation and contains 3 to 4 carbon atoms, and R'''' is a hydrogen atom, a methyl radical or a —$CH_2CH_2NH_2$ radicals, the weight ratio of the siloxane to the silane being in the range of 2:1 to 15:1, all said parts being on a weight basis.

As can be seen from the above, in addition to the water, the polish of this invention contains as essential ingredients a solvent, a wax, an emulsifier and a particular reaction product. The solvent helps to clean the leather and in addition, helps the wax to penetrate the leather as well as aiding in the emulsification of the wax and the reaction product. Any of the well-known solvents for polishes can be employed in the composition of this invention. Particularly preferred solvents, however, are the petroleum products. Examples of these solvents include turpentine, kerosine, mineral spirits, VM & P Naphtha and various of the aliphatic petroleum solvents such as those sold under the trademarks of Varsol and Skelly L solvent. When the term solvent is used herein, it should be recognized by those skilled in the art that it is meant to include not only a single solvent but mixtures thereof. For example, in the preferred embodiment of the instant invention, it is preferred that the solvent be a mixture of turpentine and Varsol in an approximate weight ratio of 2.5:1. From 25 to 100 parts of solvent per 100 parts of water is employed. Preferably the amount of solvent is in the range of 45 to 65 parts.

Various of the commercially available and commonly used polish waxes can be employed in the instant composition. Illustrative examples of suitable waxes include carnauba, beeswax, ozokerite and paraffin. Carnauba wax is preferred at this time. While from 2 to 120 parts of wax per 100 parts of water can be employed, it is preferable that the amount of wax be in the range of 10 to 25 parts.

The emulsifier can be any of the well-known emulsifiers that are commonly used for preparing emulsions. The amount used should be sufficient to produce a stable emulsion. There are numerous lists of suitable emulsifiers that can be employed so they will not be duplicated here. Suffice it to say, that the preferred embodiment employs an emulsifier prepared from a mixture of morpholine and oleic acid. The amount of emulsifier employed will usually be in the range of 4 to 25 parts, preferably 5 to 10 parts, per 100 parts of water. It should be noted that of the various emulsifying systems that can be employed a fugitive system is preferred.

The reaction product employed is prepared by reacting a hydroxyl endblocked siloxane and an amino-functional silane. The weight ratio of the siloxane to the silane used in preparing the reaction product will generally be in the range of about 2:1 to 15:1 with the preferred embodiment having a weight ratio of siloxane to silane of about 3:1. The amount of the reaction product employed is from 1 to 30 parts, preferably 3 to 10 parts, per 100 parts of water in the polish.

The reaction product can be prepared in various ways, the simplest way being by simply mixing the siloxane and silane in a liquid phase, for example, by cold blending. The siloxane and silane can also be reacted in a suitable solvent with or without heating as desired. For those who are not skilled in the art and wish more details on the preparation of such a reaction product, reference is made to U.S. Pat. No. 3,355,424, the disclosure of which is incorporated herein by reference.

As specified above, the hydroxyl endblocked siloxane in the reaction product has the unit formula $R_2SiO$, wherein one R is a methyl radical and the other R is selected from the group consisting of the methyl, phenyl, and 3,3,3-trifluoropropyl radicals. Thus, more specifically, the units which make up the siloxane can be $(CH_3)_2SiO$, $C_6H_5(CH_3)SiO$ or $CF_3CH_2CH_2(CH_3)SiO$ units or combinations thereof. The siloxane must have a viscosity in the range of about 10 to 15,000 centistokes at 25° C. The preferred embodiment is a reaction product prepared from a siloxane having a viscosity in the range of about 25 to 100 centistokes.

The silane used in preparing the reaction product is one having the general formula $R'_x(R''O)_{3-x}SiR'''NHR''''$ In the above formula, R' can be any monovalent hydrocarbon radical free of aliphatic unsaturation and which contains from 1 to 6 carbon atoms. Thus, R' can be, for example, a methyl, ethyl, propyl, butyl, amyl, hexyl, cyclohexyl, or phenyl radical. There can be 0, 1 or 2 R' radicals in the silane, i.e. $x$ is 0 to 2. Preferably, $x$ is 0. R'' in the above formula is an alkyl radical containing from 1 to 4 carbon atoms. Illustrative examples of R'' include the methyl, ethyl, propyl and butyl radicals. Preferably, R'' is a methyl radical. The R''' radical in the above formula is any divalent hydrocarbon radical free of aliphatic unsaturation and which contains 3 or 4 carbon atoms. As those skilled in the art know, there must be at least 3 carbon atoms between the silicon atom and the nitrogen atom joined by the R''' radical. Specific examples of R''' are the $-(CH_2)_3-$, $-(CH_2)_4-$ and $-CH_2CH(CH_3)CH_2-$ radicals. The R'''' radical in the above formula can be a hydrogen atom, a methyl radical or a $-CH_2CH_2NH_2$ radical.

In addition to the above essential ingredients, it will be obvious to those skilled in the art that various conventional additives can be incorporated in the emulsion polishes of the instant invention. Thus for example, dyes, perfumes, thickening agents and the like materials can also be incorporated in the instant compositions so long as they do not have any detrimental effect thereon.

Now in order that those skilled in the art may better understand how the present invention can be practiced, the following examples are given by way of illustration and not by way of limitation. All parts and percents referred to herein are on a weight basis and all viscosities measured at 25° C. unless otherwise specified.

EXAMPLE 1

Four leather polish formulations were prepared according to the following procedure. The wax and oleic acid were heated to about 85° C. and then the mixture of Varsol and turpentine which had been heated to 70° C. was added. The reaction product of the siloxane and amine which had previously been prepared by cold blending at a 3:1 weight ratio for 3 hours was added to the hot oil phase. Then the water phase which consists of the morpholine (if any), the preservative for the wax, and one half of the amount of water was heated to 80° C. and added to the oil phase. The remaining water was then added cold to the above mixture. The emulsion is then cooled with agitation to 40° C. and bottled. Mixing in all instances was accomplished with a high shear on a Epenbach mixer. A colloid mill is used for production-size batches. While various other procedures and orders of mixing can be employed, the above process represents the preferred embodiment of the invention.

The formulations all contained 61.9 parts of water, 25 parts turpentine, 10 parts of an aliphatic petroleum solvent (Varsol), 10 parts carnauba wax, 3 parts oleic acid, 4.5 parts of the reaction product and 0.1 part of a preservative. In preparing the reaction product for each of the formulations a hydroxyl endblocked polydimethylsiloxane having about 4 percent by weight hydroxyl groups and a viscosity of about 40 centistokes was employed. The silanes used in preparing the reaction products had the following formulas. For formulation A, $(CH_3O)_3SiCH_2CH(CH_3)CH_2NHCH_2CH_2NH_2$. For formulation B, $CH_3(CH_3O)_2Si(CH_2)_3NHCH_2CH_2NH_2$. For formulation C, $(CH_3O)_3Si(CH_2)_3NHCH_2CH_2NH_2$. For formulation D, $(CH_3O)_3Si(CH_2)_3NH(CH_3)$. After the polishes had been prepared and allowed to shelf-age for one week, they were checked for performance on Black Jetta calf leather. The polishes were checked for ease of application, rub-out and appearance on the leather. The treated leather was then checked for gloss (60° Gardner Gloss Meter), percent solids pickup, water spot resistance (static test, 1 drop water for 5 minutes), water contact angle (water spraying across leather surface), initial water penetration and percent water absorbed at 4000 flexes on the Dow Corning (Syl-mer®) tester. The leather was again checked for appearance after flexing. The results of the leather evaluation are set forth in Table I below.

TABLE I

| Performance | Formulation | | | |
|---|---|---|---|---|
| | A | B | C | D |
| Ease of application | V.G. | V.G. | V.G. | V.G. |
| Gloss (initial/final) | 10/45 | 11/47 | 15/52 | 15/37 |
| Appearance | E | E | E | E |
| Water spot resistance: | | | | |
| Static | E | E | E | E |
| Dynamic | E | E | E | E |
| Syl-mer® tester: | | | | |
| Percent solids pickup | 2.68 | 3.05 | 3.21 | 2.78 |
| Initial water penetration | 1,575 | 1,120 | 1,752 | 1,321 |
| Percent water absorbed (4,000 flexes) | 29.1 | 34 | 31 | 39 |

NOTE.—V.G.=very good; E=excellent.

EXAMPLE 2

Four polish emulsions were prepared which contained 10 parts of carnauba wax, 20 parts of turpentine, 10 parts of the aliphaitc petroleum solvent of Example 1, and 4 parts of a reaction product prepared from a hydroxylated polydimethylsiloxane having the viscosity of about 40 centistokes and a silane of the formula

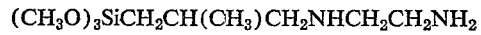

$(CH_3O)_3SiCH_2CH(CH_3)CH_2NHCH_2CH_2NH_2$ and 0.1 part of a preservative. In addition, formulation A contained 62.9 parts water and 5.6 parts oleic acid, formulation B contained 62.9 parts water and 3 parts oleic acid, formulation C contained 55.9 parts water and 3 parts oleic acid, and formulation D contained 55.9 parts water and 2.7 parts oleic acid. In formulation A the ratio of siloxane to silane in the reaction product was 2:1. In formulations B and C the ratio of the siloxane to silane in the reaction product was 3:1 and in formulation D the ratio of siloxane to silane in the reaction product was 9:1. These emulsion polishes were evaluated in the same manner as the polishes of Example 1. The test results of these evaluations are set forth in Table II below.

TABLE II

| Performance | Formulation | | | |
|---|---|---|---|---|
| | A | B | C | D |
| Ease of application | G | G | G | F-G |
| Gloss (initial/final) | 16/38 | 13/44 | 15/42 | 16/46 |
| Appearance | G | E | E | E |
| Water spot resistance: | | | | |
| Static | E | E | E | G |
| Dynamic | E | E | E | E |
| Syl-mer ® tester | | | | |
| Percent solids pickup | 3.62 | 3.48 | 3.54 | 3.51 |
| Percent water absorbed (4,000 flexes) | 37.3 | 28.8 | 36 | 30.3 |
| Final appearance | F | G-E | G-E | G-E |

NOTE.—G=good; F=fair.

EXAMPLE 3

Six polish formulations were prepared which consisted essentially of 10 parts carnauba wax, 20 parts turpentine, 10 parts of the aliphatic petroleum solvent of Examples 1 and varying amounts of water, oleic acid and a reaction product as described in Example 2 wherein the weight ratio of the siloxane and silane is about 3:1. Specifically, formulation A contained 72.9 parts water, 3 parts oleic acid, and 4 parts of the reaction product. Formulation B contained 61.9 parts water, 4 parts oleic acid and 5 parts of the reaction product. Formulation C contained 60.9 parts water, 5 parts oleic acid, and 6 parts of the reaction product. Formulation D contained 65.9 parts water, 6 parts oleic acid, and 8 parts of the reaction product. Formulation E contained 61.9 parts water, 8 parts oleic acid and 10 parts of the reaction product. Formulation F contained 54.9 parts water, 10 parts oleic acid, and 15 parts of the reaction product. These six formulations were evaluated on leather in the same manner as the polishes of Example 1. The results of these tests are set forth in Table III.

TABLE III

| Performance | Formulation | | | | | |
|---|---|---|---|---|---|---|
| | A | B | C | D | E | F |
| Ease of application | G | G | G | F | F | F |
| Gloss 60° gloss meter (initial/final) | 13/32 | 16/35 | 16/35 | 11/14 | 16/20 | 15/20 |
| Appearance | G | G | G | F | F | F |
| Water spot resistance: | | | | | | |
| Static | E | E | E | E | E | E |
| Dynamic | E | E | E | E | E | E |
| Syl-mer ® tester: | | | | | | |
| Percent solids pickup | | 2.67 | 3.01 | | | |
| Percent water absorbed (4000 flexes) | | 34.5 | 30.5 | | | |
| Final appearance | | G | G | | | |

EXAMPLE 4

Five polish formulations were prepared which consisted essentially of 61.9 parts water, 25 parts turpentine, 10 parts of the aliphatic petroleum solvent of Example 1, 10 parts carnauba wax, 3 parts oleic acid, 4.5 parts of a reaction product of a hydroxylated polydimethylsiloxane having a viscosity of about 40 centistokes and a silane having the formula

and 0.1 part of a preservative. The only difference in the five polish formulations was the preparation time of the reaction product. In formulation A, it was ½ hour. In formulation B, 1 hour. In formulation C, 1½ hours. In formulation D, 3 hours. In formulation E, 6 hours. These five formulations were evaluated in the same manner as the polishes of Example 1. In addition, there was evaluated an untreated piece of leather. The results of these tests were set forth in Table IV below.

TABLE IV

| Performance | Formulation | | | | | Untreated control |
|---|---|---|---|---|---|---|
| | A | B | C | D | E | |
| Ease of application | E | E | E | E | V.G. | |
| Gloss (initial/final) | 12/43 | 12/44 | 14/53 | 12/42 | 14/43 | 14/14 |
| Appearance | E | E | E | E | E | P |
| Syl-mer ® tester: | | | | | | |
| Percent solids pickup | 1.18 | 1.19 | 1.47 | 1.52 | 1.08 | |
| Initial water penetration | 350 | 1,005 | 1,544 | 1,977 | 1,905 | 157 |
| Percent water absorbed (4,000 flexes) | 47 | 44 | 41 | 32 | 30 | 77.7 |
| Final appearance | F-G | G | G-E | G-E | G | V.P. |

NOTE.—P=poor; V.P.=very poor.

EXAMPLE 5

Three polish formulations were prepared which consisted essentially of 61.9 parts water, 25 parts turpentine, 10 parts of the aliphatic petroleum solvent of Example 1, 10 parts carnauba wax, 3.75 parts oleic acid, 0.60 part morpholine, 4 parts of the reaction product and 0.1 part of a preservative. In formulation A the reaction product was prepared from a hydroxylated polydimethylsiloxane having a viscosity of about 80 centistokes. In formulation B the reaction product was prepared from a hydroxyl endblocked phenylmethylsiloxane. In formulation C the reaction product was prepared from a hydroxyl endblocked (methyl)3,3,3-trifluoropropylsiloxane. The silane used to prepare the reaction product in each of these formulations had the formula

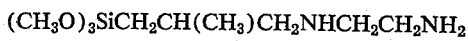

and the weight ratio of the siloxane to silane in each case was 3:1. These polishes were evaluated as in Example 1 and the test results are set forth in Table V below.

TABLE V

| Performance | Formulation | | |
|---|---|---|---|
| | A | B | C |
| Ease of application | G | F | F |
| Gloss (initial/final) | 14/20 | 12/30 | 12/20 |
| Appearance | E | G | G |
| Water spot resistance: | | | |
| Static | E | G-E | G-E |
| Dynamic | E | G-E | G-E |

EXAMPLE 6

In this example, various waxes were evaluated. Formulation A consisted essentially of 62.9 parts water, 20 parts turpentine, 10 parts of the aliphatic petroleum solvent of Example 1, 3 parts oleic acid, 10 parts carnauba wax, 4 parts of a reaction product of a hydroxyl endblocked polydimethylsiloxane having a viscosity of about 40 centistokes and a silane of the formula

(the weight ratio of the siloxane to silane being 3:1) and 0.1 part of a preservative. Formulation B consists essentially of 57.9 parts water, 25 parts of the aliphatic petroleum solvent of Example 1, 2.5 parts oleic acid, 1.5 parts morpholine, 6 parts carnauba wax, 3 parts beeswax, 4 parts of the reaction product of formulation A and 0.1 part of a preservative. Formulation C was identical to formulation B except that it contained 8 parts instead of 6 parts of carnauba wax and 2 parts of paraffin instead of the beeswax. Formulation D consisted essentially of 60.9 petroleum solvent of Example 1, 2.5 parts oleic acid, 1.5 parts morpholine, 9 parts carnauba wax, 1 part ozokerite wax, 4 parts of the reaction product of formulation A and 0.1 part of a preservative. Formulation E consisted essentially of 57.9 parts of water, 25 parts of the aliphatic petroleum solvent of Example 1, 2.5 parts oleic acid, 1.5 parts morpholine, 8 parts carnauba wax, 2 parts paraffin, 4 parts of a reaction product identical to that of formulation A except that the weight ratio of the siloxane to the silane mas about 13.3:1, and 0.1 part of a preservative. These five formulations were evaluated as the polishes of Example 1. The test results are set forth in Table VI below.

TABLE VI

| Performance | Formulation | | | | |
|---|---|---|---|---|---|
| | A | B | C | D | E |
| Ease of application | G | G | F | F | G |
| Gloss (initial/final) | 16/35 | 15/28 | 14/35 | 14/37 | 14/38 |
| Appearance | G | G | G | F-G | G |
| Water spot resistance: | | | | | |
| Static | E | E | E | E | E |
| Dynamic | E | E | E | E | E |

EXAMPLE 7

An excellent neutral colored shoe polish was prepared which consisted essentially of 61.9 parts water, 25 parts turpentine, 10 parts of the aliphatic petroleum solvent of Example 1, 3.75 parts oleic acid, 0.6 part morpholine, 10 parts carnauba wax, 4 parts of a reaction product of a hydroxylated polydimethylsiloxane having the viscosity of about 40 centistokes and a silane of the formula

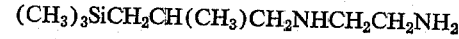

(wherein the weight ratio of the siloxane to silane was 3:1) and 0.1 part of a preservative. This neutral shoe polish can be converted to a black shoe polish by the addition of 2 parts of a black dye such as Nigrosine SSJ. The same polish can be converted to a brown colored polish by the addition of 0.5 part yellow oil (such as Oil Yellow), 0.05 part blue oil (such as Oil Blue A), 0.075 part red oil (such as Oil Red), and 2 parts of burnt umber. The neutral polish can be converted to a cordovan shoe polish by the addition of 2 parts of a brown pigment oil, such as Oil Brown N.

EXAMPLE 8

When the silanes specified below are substituted for the silane of Example 5 in preparing the reaction products, essentially identical results can be obtained from the resulting polishes made therefrom.

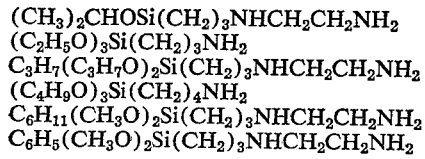

$(CH_3)_2CHOSi(CH_2)_3NHCH_2CH_2NH_2$
$(C_2H_5O)_3Si(CH_2)_3NH_2$
$C_3H_7(C_3H_7O)_2Si(CH_2)_3NHCH_2CH_2NH_2$
$(C_4H_9O)_3Si(CH_2)_4NH_2$
$C_6H_{11}(CH_3O)_2Si(CH_2)_3NHCH_2CH_2NH_2$
$C_6H_5(CH_3O)_2Si(CH_2)_3NHCH_2CH_2NH_2$

That which is claimed is:

1. In a method of polishing leather the improvement comprising employing as the polish an emulsion consisting essentially of 100 parts of water, 25 to 100 parts of a solvent 2 to 120 parts of a wax, 4 to 25 parts of emulsifier and 1 to 30 parts of the reaction product of (1) a hydroxyl endblocked siloxane of the unit formula $R_2SiO$ wherein one R is a methyl radical and the other R is selected from the group consisting of the methyl, phenyl and 3,3,3-trifluoropropyl radicals, said siloxane having a viscosity in the range of about 10 to 15,000 cs. at 25° C., and (2) a silane of the general formula $R'_x(R''O)_{3-x}SiR'''HR''''$, wherein R' is a monovalent hydrocarbon radical free of aliphatic unsaturation and contains from 1 to 6 carbon atoms, x has a value from 0 to 2, R" is an alkyl radical containing from 1 to 4 carbon atoms, R''' is a divalent hydrocarbon radical free of aliphatic unsaturation and contains 3 to 4 carbon atoms, and R'''' is a hydrogen atom, a methyl radical or a —$CH_2CH_2NH_2$ radical, the weight ratio of the siloxane to the silane being in the range of 2:1 to 15:1, all said parts being on a weight basis.

2. The method of claim 1 wherein there is 45 to 65 parts of solvent, 10 to 25 parts of wax, 5 to 10 parts of emulsifier and 3 to 10 parts of the reaction product.

3. The method of claim 2 wherein the solvent is a mixture of turpentine and an aliphatic petroleum solvent in a weight ratio of about 2.5:1, the wax is carnauba wax, the emulsifier is a mixture of oleic acid and morpholine in a weight ratio of about 6.25:1, and in the reaction product both R's of the siloxane are methyl radicals, and the siloxane has a viscosity in the range of 25 to 100 cs.

4. The method of claim 3 wherein in the reaction product in the silane x is O, R" is a methyl radical, R''' is —$CH_2CH(CH_3)CH_2$— and R'''' is —$CH_2CH_2NH_2$, and the weight ratio of the siloxane to the silane is about 3:1.

5. The method of claim 4 wherein there is about 55 parts of solvent, about 15 parts of wax and about 6.5 parts of the reaction product.

6. The method of claim 3 wherein in the reaction product in the silane x is O, R" is a methyl radical, R''' is—$(CH_2)_3$— and R'''' is —$CH_2CH_2NH_2$, and the weight ratio of the siloxane to the silane is about 3:1.

7. The method of claim 6 wherein there is about 55 parts of solvent, about 15 parts of wax and about 6.5 parts of the reaction product.

8. The method of claim 3 wherein in the reaction product in the silane x is 0, R" is an ethyl radical, R''' is —$(CH_2)_3$— and R'''' is a hydrogen atom, and the weight ratio of the siloxane to the silane is about 3:1.

9. The method of claim 3 wherein in the reaction product in the silane x is O, R" is a methyl radical, R''' is —$(CH_2)_3$—and R'''' is a methyl radical and the weight ratio of the siloxane to the silane is about 3:1.

10. The method of claim 3 wherein in the reaction product in the silane x is 1, R' is a methyl radical, R" is a methyl radical, R''' is —$(CH_2)_3$— and R'''' is —$CH_2CH_2NH_2$, and the weight ratio of the siloxane to the silane is about 3:1.

11. The method of claim 2 wherein the solvent is mineral spirits.

References Cited
UNITED STATES PATENTS

| | | | |
|---|---|---|---|
| 2,803,610 | 8/1957 | Kress | 106—10 X |
| 2,947,771 | 8/1960 | Bailey | 260—448.2 |
| 3,045,036 | 7/1962 | Jex et al. | 106—10 X |
| 3,110,601 | 11/1963 | Emblem et al. | 106—3 X |
| 3,175,921 | 3/1965 | Hedlund | 106—10 X |
| 3,306,869 | 2/1967 | Lahr et al. | 106—10 X |
| 3,329,520 | 7/1967 | Emblem et al. | 106—287 |
| 3,341,338 | 9/1967 | Pater | 106—10 X |
| 3,395,169 | 7/1968 | Mitchell | 260—448.2 |
| 3,402,191 | 9/1968 | Morehouse | 260—448.2 |
| 3,508,933 | 4/1970 | Yates | 106—10 |

JOAN B. EVANS, Primary Examiner

U.S. Cl. X.R.

106—11, 271; 117—135.1, 135.5, 142; 252—8.57; 260—28, 46.5, 29.2 M, 824, 825